(12) United States Patent
Williams et al.

(10) Patent No.: US 7,632,103 B2
(45) Date of Patent: Dec. 15, 2009

(54) MODULAR BOARD ARRANGEMENT

(75) Inventors: Theodore G. Williams, Booneville, MS (US); Thomas Dunlap, Jr., Bartlett, IL (US); Steven J. Beno, Gurnee, IL (US)

(73) Assignee: General Binding Corporation, Northbrook, IL (US)

( * ) Notice: Subject to any disclaimer, the term of this patent is extended or adjusted under 35 U.S.C. 154(b) by 623 days.

(21) Appl. No.: 11/290,981

(22) Filed: Nov. 30, 2005

(65) Prior Publication Data

US 2006/0183101 A1 Aug. 17, 2006

Related U.S. Application Data

(60) Provisional application No. 60/648,305, filed on Jan. 28, 2005.

(51) Int. Cl.
*B43L 1/02* (2006.01)

(52) U.S. Cl. .................................. 434/425; 434/408

(58) Field of Classification Search .............. 434/408, 434/413, 428–430, 72, 79, 425; 40/605; 160/135; 52/36.1, 36.5, 312
See application file for complete search history.

(56) References Cited

U.S. PATENT DOCUMENTS

| | | | |
|---|---|---|---|
| 1,790,549 A | 1/1931 | Masters | |
| 1,965,580 A | 7/1934 | Dill | |
| 1,984,845 A | 12/1934 | Smith et al. | |
| 2,092,323 A | 9/1937 | Myers | |
| 2,135,982 A | 11/1938 | Masters | |
| 2,300,248 A | 10/1942 | Elnett | |
| 2,319,278 A | 5/1943 | Urbain | |
| 2,651,852 A | 9/1953 | Urbain | |
| 2,679,700 A | 6/1954 | Urbain | |
| 2,881,538 A | 4/1959 | Lewis | |
| 2,895,234 A | 7/1959 | Rohrman et al. | |
| 3,034,230 A | 5/1962 | Windram | |
| 3,363,341 A | 1/1968 | Glassman | |
| 3,363,871 A | 1/1968 | Slazik et al. | |
| 3,466,777 A * | 9/1969 | Wistrand et al. | 40/605 |
| 3,975,875 A * | 8/1976 | Goss, Jr. | 52/204.53 |

(Continued)

FOREIGN PATENT DOCUMENTS

DE 61863 9/1891

(Continued)

OTHER PUBLICATIONS

European Search Report and Search Opinion for corresponding European Application No. 06250355.2 mailed on Sep. 19, 2007.

*Primary Examiner*—Kurt Fernstrom
(74) *Attorney, Agent, or Firm*—Michael Best & Friedrich LLP

(57) ABSTRACT

The invention provides a modular board arrangement that may be easily transported and assembled. The board arrangement comprises a plurality of boards and individual frame members that can be assembled in a variety of ways to provide a desired arrangement. The board arrangement may additionally comprise side frame members and/or a tray. The board arrangement is expandable to a desired length by adjacently adding additional board and frame units. Multiple board and frame units may be connected to one another by a transition piece. A connector may be provided for attaching an object such as the tray to the board arrangement. A removable faceplate may also be provided.

20 Claims, 18 Drawing Sheets

U.S. PATENT DOCUMENTS

| | | | |
|---|---|---|---|
| 4,074,490 A * | 2/1978 | Nagase | 52/312 |
| 4,166,332 A * | 9/1979 | Donovan | 40/605 |
| 4,437,839 A | 3/1984 | Stempel | |
| 4,785,565 A * | 11/1988 | Kuffner | 40/605 |
| 5,097,643 A * | 3/1992 | Wittler | 52/238.1 |
| 5,176,522 A | 1/1993 | Robertson, Jr. | |
| 5,220,763 A | 6/1993 | Armitage | |
| 5,301,477 A | 4/1994 | Rellinger et al. | |
| 5,381,845 A * | 1/1995 | Ruggie et al. | 160/135 |
| 5,727,952 A | 3/1998 | Schenck et al. | |
| 5,976,663 A | 11/1999 | Davis et al. | |
| 5,987,825 A * | 11/1999 | Rosen | 52/36.1 |
| 5,989,676 A | 11/1999 | Davis et al. | |
| 6,109,329 A * | 8/2000 | Russo | 160/135 |
| 6,139,331 A | 10/2000 | Owen | |
| D435,593 S | 12/2000 | Hellwig et al. | |
| D436,128 S | 1/2001 | Keglmaier | |
| 6,203,878 B1 * | 3/2001 | Davis et al. | 428/83 |
| 6,328,571 B1 | 12/2001 | Dricken et al. | |
| D459,756 S | 7/2002 | Lio et al. | |
| D462,992 S | 9/2002 | Beno | |
| D463,493 S | 9/2002 | Beno | |
| 6,493,995 B2 * | 12/2002 | McKenzie | 52/36.4 |
| D475,407 S | 6/2003 | Beno | |
| 2002/0092626 A1 * | 7/2002 | Beall | 160/135 |
| 2006/0019232 A1 * | 1/2006 | Fischer et al. | 434/407 |

FOREIGN PATENT DOCUMENTS

| | | |
|---|---|---|
| DE | 2226629 | 12/1972 |
| EP | 1484455 | 12/2004 |

* cited by examiner

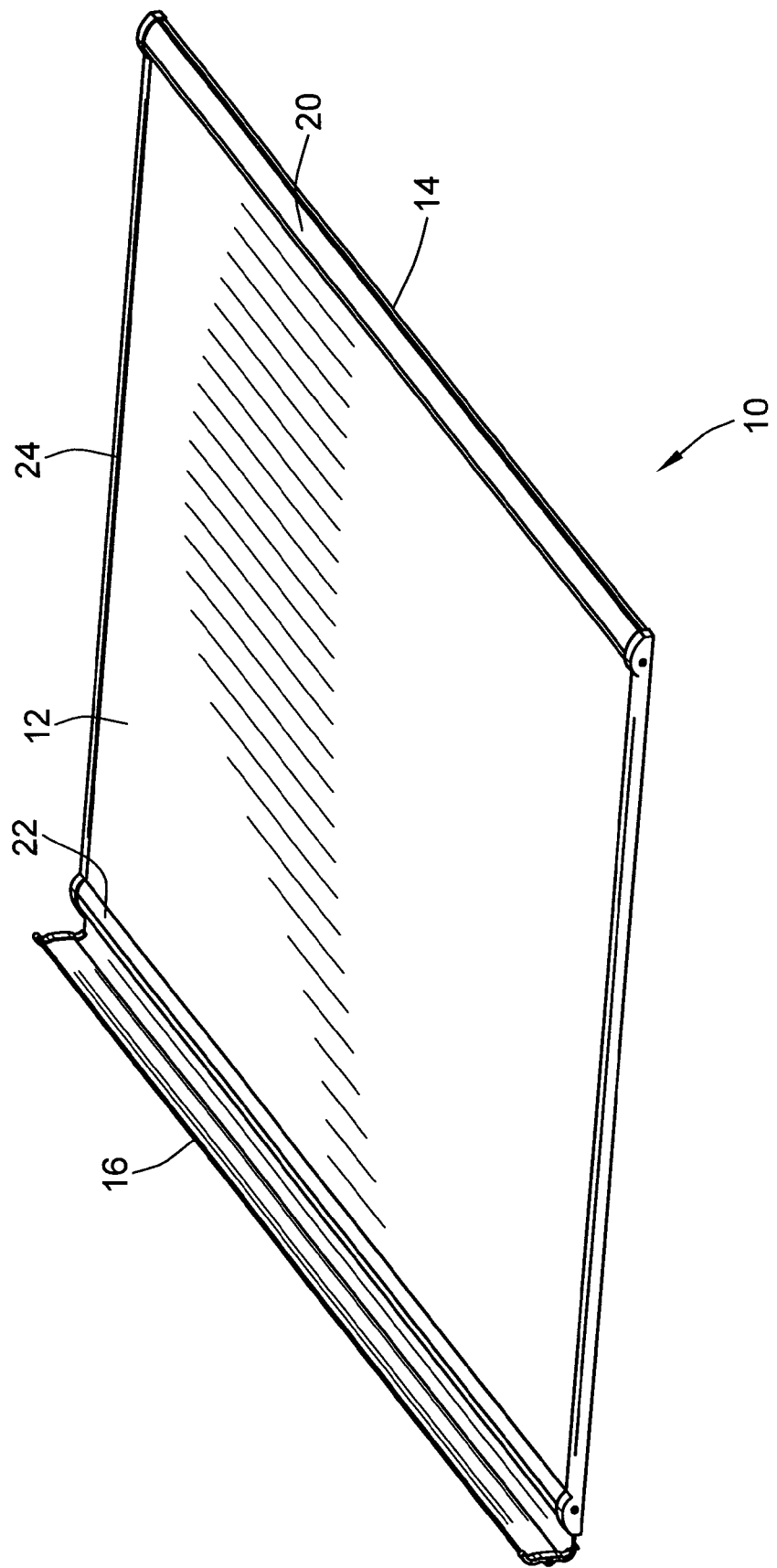

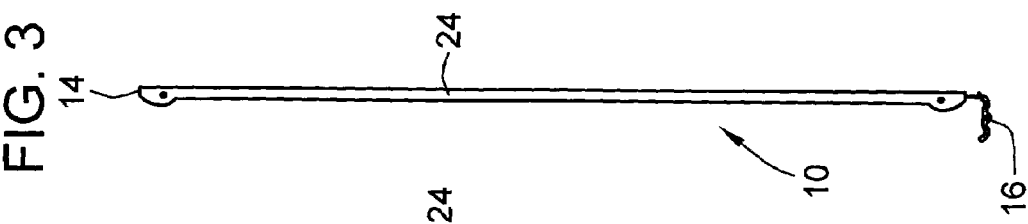
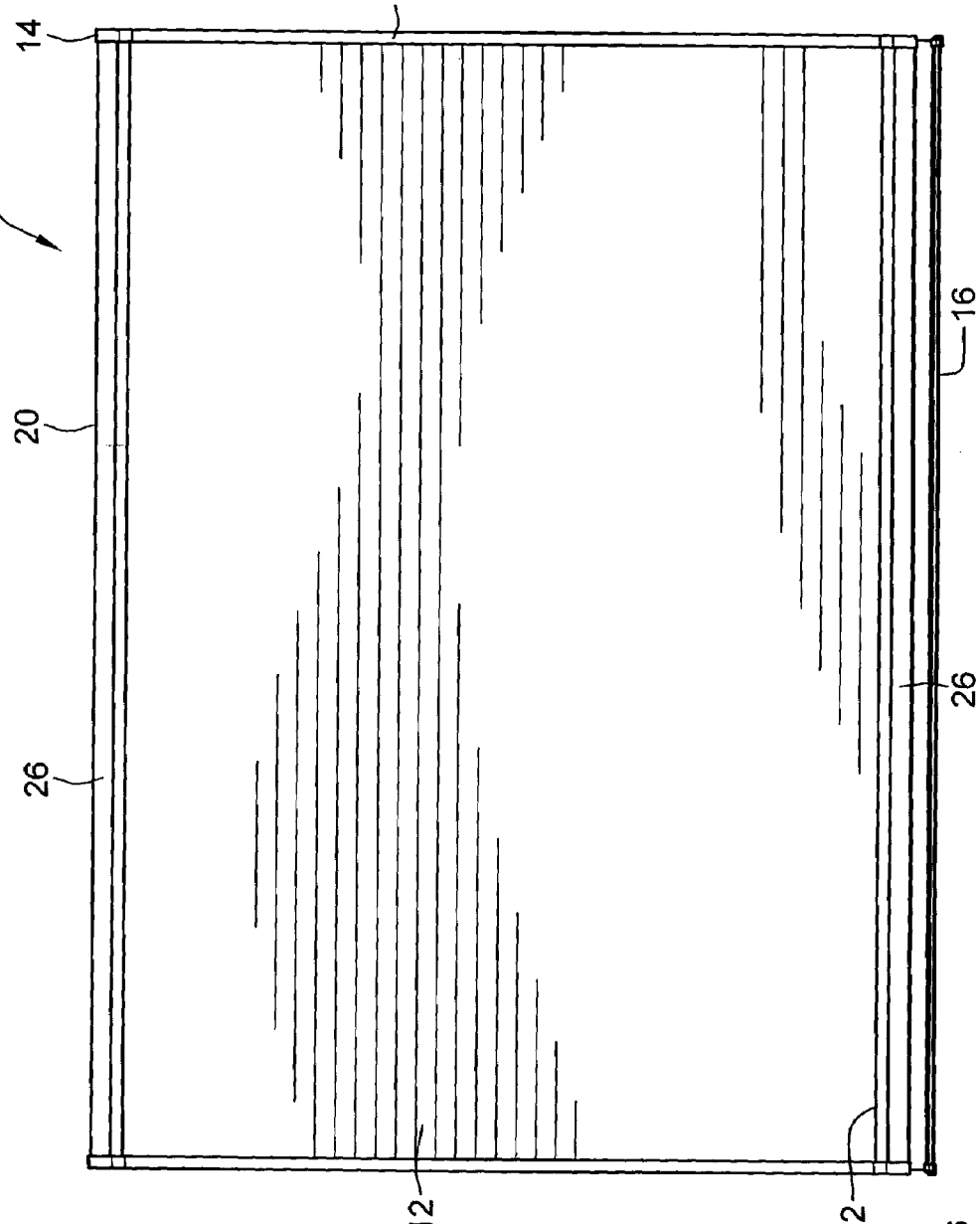
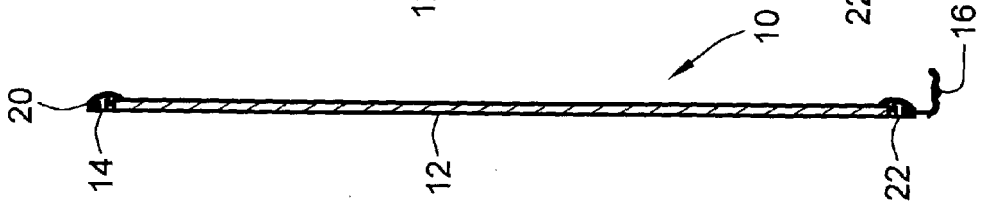

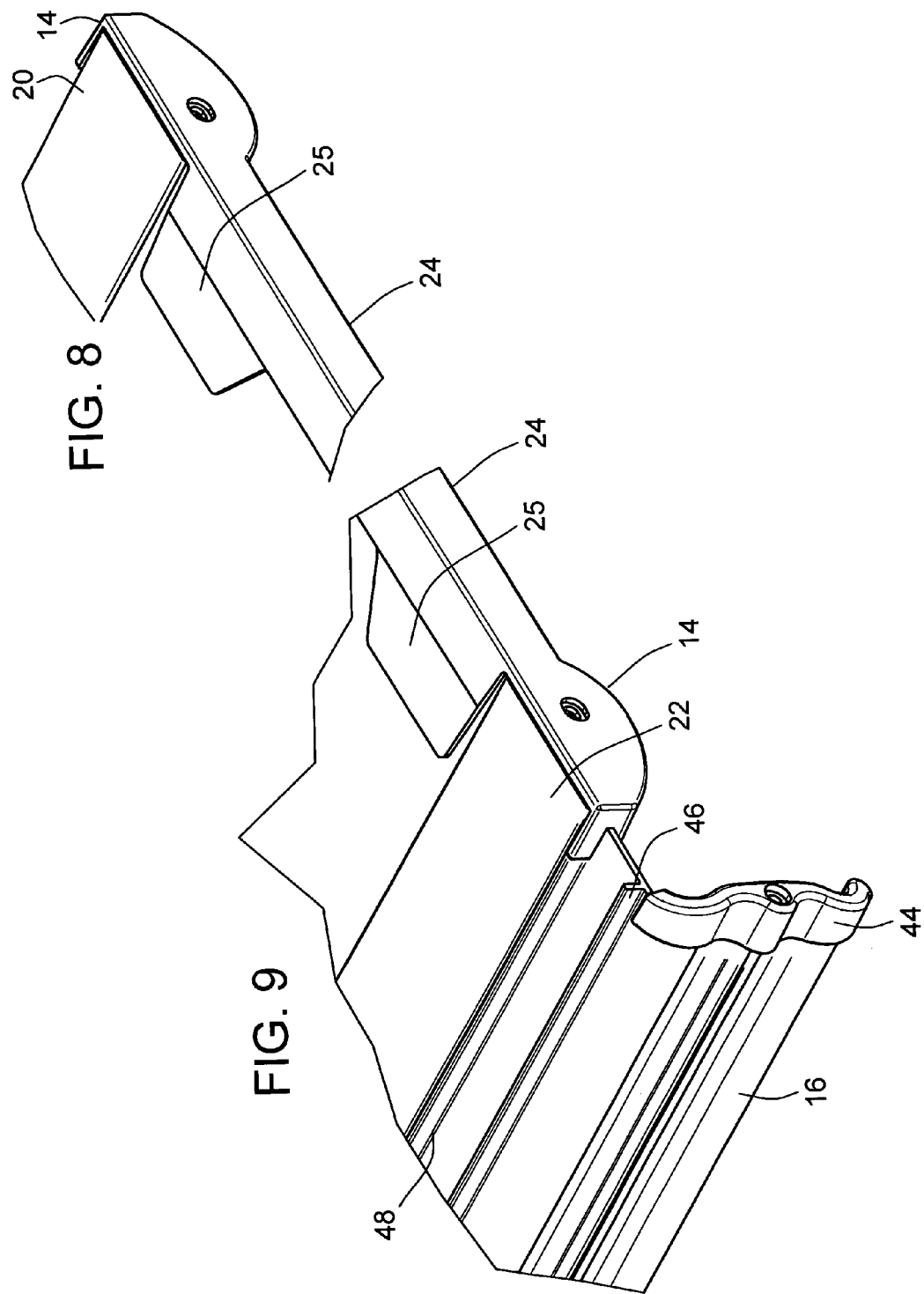

MODULAR BOARD ARRANGEMENT

CROSS-REFERENCE TO RELATED APPLICATIONS

This patent application claims the benefit of U.S. Provisional Patent Application No. 60/648,305, filed Jan. 28, 2005.

FIELD OF THE INVENTION

This invention pertains to board arrangements, and more specifically to modular board arrangements that are typically utilized in classrooms and the like.

BACKGROUND OF THE INVENTION

Current board arrangements, such as chalk boards and marker boards used in schools, are extremely large and heavy. These types of boards frequently exceed twelve or more feet in length. This makes these types of boards both difficult and expensive to transport over long distances. Therefore, purchasers of such board arrangements are typically forced to purchase from local suppliers, which limits selection for the purchaser and can lead to higher purchase prices due to a lack of competition amongst local suppliers. Also due to the size and weight of current board arrangements, it is difficult for a single individual to unload these boards without damaging them and nearly impossible for a lone individual to install such boards. Despite this fact, however, boards for schools are typically delivered by a single individual, who unloads a board by pulling on the lead end of the board to slide the board out of the truck until the trailing end of the board drops from the truck to the pavement, often damaging the board. Due to their length, it is also difficult to navigate these boards through the interior of a building because hallways are typically not wide enough for these boards to be readily maneuvered around corners.

Such arrangements also typically offer little or no opportunity for customization of the board to fit a given environment or interior design. Moreover, they do not provide the designer or user with the versatility in use of varied available board media. While smaller board arrangements may be utilized, current smaller board arrangements typically comprise metallic frames that are relatively unappealing, particularly for use in highly stylized training centers and the like. If a user wants to build a larger board arrangement using such smaller board arrangements, they must place individual board units next to each other. This results in a further visually undesirable appearance inasmuch as the board combination appears to be merely a hodgepodge collection of individual boards rather than a single design element.

Furthermore, the components of current board arrangements are typically fixed to one another and then fixed to the wall. As a result, damage to one or more components of a board cannot generally be economically repaired on site, but, rather, requires the replacement of the entire board assembly. For example, if a portion of the writing surface of a chalk or marker board is severely damaged such the user wishes to have that portion replaced, the entire board assembly must generally be removed. Similarly, if a board is damaged in shipment, the entire board must be replaced. Moreover, boards are typically provided with standardized hardware, i.e., they include a fixed tray or they do not, and a tray cannot typically be readily installed on site. Due to the fact that attaching objects to the board arrangement requires fixing them to the wall or board arrangement, objects, such as trays, cannot be easily added or removed from the board arrangement.

BRIEF SUMMARY OF THE INVENTION

The invention provides a modular board arrangement that can be easily transported and assembled in that it provides a plurality of individual components that may be assembled into a final board arrangement on site. The board arrangement provides the user with the ability to install a highly customized board arrangement of substantially any desired length and having any number of individual types of boards from a standard collection of components that may be easily and safely shipped without damage thereto. The modular and component nature of the board arrangement further avoids the shipping and installment difficulties generally experienced with lengthy, unitary board arrangements. The modular board arrangement typically includes a plurality of individual units, each including a board, the board of each unit being chosen from board media, such as dry erase boards, chalk boards, bulletin or push pin boards of any given material, magnetic boards, or any other desired board. Each unit further includes first and second frame members that each includes a retaining portion. In practice, the frame members are typically of the same design so that they can be used interchangeably. In assembly, the frame members are disposed against and secured to the wall in a parallel arrangement and spaced such that the board may be received in the retaining portions and held against the wall. The modular board arrangement further includes a pair of side members that act as end caps to the first placed board, being disposed on the right and left sides of the board. A second pair of frame members is similarly mounted to the wall to support a second board adjacent the first board. With the second board mounted adjacent to the first, a transition piece is utilized as a bridge between the two boards. The same process may be repeated over and over again to create a board arrangement of any desired length having any desired board media.

In an embodiment of the invention, the invention may comprise a modular board kit for constructing a board assembly of a desired length on a support structure on location. The kit may comprise a plurality of boards, a plurality of horizontal frame members, and a plurality of vertical frame members. Each of the boards may comprise at least first and second horizontal edges and at least first and second vertical edges. The plurality of horizontal frame members are suitable for mounting to the support structure in a substantially horizontal manner. Each horizontal frame member comprises a horizontal frame member receiving portion adapted to receive a respective one of the first and second horizontal edges of a single one of said boards, wherein said single one of said boards extends outward from a respective one of the horizontal frame members in a first direction relative to the horizontal frame member. The plurality of vertical frame members are suitable for mounting to the support structure in a substantially vertical manner. Each vertical frame member may be adapted to be disposed adjacent at least a respective one of the first and second vertical edges of at least one said board, wherein said at least one said board extends outward from the vertical frame member in a first direction relative to the vertical frame member. The at least one of said vertical frame members may be adapted to be disposed adjacent at least one of the first and second vertical edges of a first of said boards and at least one of the first and second vertical edges of a second of said boards, said first and second boards extending in horizontal directions outward from the at least one of said vertical frame members, said horizontal directions being disposed at an angle to one another. The plurality of boards and vertical and horizontal frame members may be utilized to construct a board assembly of the desired length on the support structure on location with said at least one of said vertical frame members being disposed between adjacent boards.

In another embodiment of the invention, the invention may comprise a method of assembling a modular board assembly to a support structure on location. A first horizontal frame member and a second horizontal frame member may be attached to the support structure such that the first horizontal frame member and the second horizontal frame member are substantially parallel with one another. The first horizontal frame member has a first horizontal frame member receiving portion adapted to be disposed adjacent to a single board, and the second horizontal frame member has a second horizontal frame member receiving portion adapted to be disposed adjacent to a single board. A first board is disposed between the first horizontal frame member and the second horizontal frame member such that the first board is disposed within the first horizontal frame member receiving portion and the second horizontal frame member receiving portion. A first vertical frame member receiving portion of a first vertical frame member is disposed adjacent to the first board such that the first vertical frame member is substantially perpendicular to the first horizontal frame member and the second horizontal frame member, and the first vertical frame member receiving portion being adapted to receive a single board. A second vertical frame member receiving portion of a second vertical frame member is disposed adjacent to the first board such that the second vertical frame member is substantially perpendicular to the first horizontal frame member and the second horizontal frame member. A third horizontal frame member and a fourth horizontal frame member are attached to the support structure such that the third horizontal frame member and the fourth horizontal frame member are substantially parallel with one another and substantially perpendicular to a line perpendicular to the first horizontal frame member. The third horizontal frame member has a third horizontal frame member receiving portion adapted to be disposed adjacent to a single board, and the fourth horizontal frame member has a fourth horizontal frame member receiving portion adapted to be disposed adjacent to a single board. A second board is disposed between the third horizontal frame member and the fourth horizontal frame member such that the second board is disposed within the third horizontal frame member receiving portion and the fourth horizontal frame member receiving portion. The second board is adjacent to the second vertical frame member. A third vertical frame member having a third vertical frame member receiving portion is disposed adjacent to the second board such that the third vertical frame member is substantially parallel to the first vertical frame member and second vertical frame member.

The board arrangement may further include component accessories that are likewise preferably coupled to the frame members. For example, it can include a flag holder, a map rail, and/or a tray for retaining markers, chalk, or the like. The arrangement may additionally include a decorative faceplate that may be coupled to the frame members to provide substantially any desired appearance to the board frame, such as, for example, wood grain, polished or brushed metal, a given decorative color, etc.

In an embodiment of the invention, the frame for the board assembly may comprise a front side having at least one extension member along the front side, the at least one extension member disposed substantially perpendicular to the front side and having a thickness near a distal end of the extension member that is larger than a thickness at a proximal end of the extension member, and a face plate removably mountable to the at least one extension member.

It will be appreciated that the frame may comprise a face plate that comprises at least one face plate coupler along a side of the face plate opposing the front side such that the at least one extension member engages the face plate coupler to removably mount the face plate to the at least one extension member. The frame may further comprise an intermediary connector disposed between the front side and the face plate when the face plate is mounted to the at least one extension member. The frame may have a structure wherein at least one of the extension member and the face plate coupler comprises a protrusion, and the other of the extension member and the face plate comprises a recess.

The component accessories may be attached by any suitable arrangement. The invention also provides a connecting arrangement wherein one of the component or the frame member includes a receiving portion comprising a channel, the channel comprising at least one detent disposed within the channel, and the other of the component or the frame member comprises an insertion portion comprising a flange having at least one elongated tooth extending from the flange. When the flange of the insertion portion is inserted into the channel of the receiving portion, the at least one tooth engages the at least one detent to retain the insertion portion in the channel.

It will be appreciated that the connector may comprise at least one detent disposed across substantially the entire length of the channel. The connector may comprise at least one tooth disposed across substantially the entire length of the flange. The connector may comprise a structure wherein the at least one tooth flexes in a direction toward the flange when the flange is inserted into the channel, and the at least one tooth engages the at least one detent by moving away from the flange and into the at least one detent.

These and other advantages of the invention, as well as additional inventive features, will be apparent upon reading the following detailed description and upon reference to the drawings.

BRIEF DESCRIPTION OF THE DRAWINGS

FIG. 1 is a perspective view from the front of a unit of a board arrangement constructed in accordance with teachings of the invention.

FIG. 2 is a front elevational view of the unit of FIG. 1.

FIG. 3 is an elevational side view of the unit of FIGS. 1-2.

FIG. 4 is a cross-sectional side view of the unit of FIGS. 1-3.

FIG. 8 is a fragmentary perspective view from behind of a top corner a board unit of the board arrangement of FIGS. 1-7.

FIG. 9 is a fragmentary perspective view from behind of a bottom corner and tray of a board unit of the board arrangement of FIGS. 1-7.

DETAILED DESCRIPTION OF THE INVENTION

Turning now to the figures, there is shown in FIGS. 1-4, an embodiment of a unit of a modular board arrangement 10 in accordance with the teachings of the invention. The board arrangement 10 provides a way for individuals or entities, such as schools, universities, and businesses, to have the equivalent of a large board arrangement that unlike a large board arrangement is easily transportable, easily installable, and expandable to a desired size. In some embodiments, each modular board arrangement unit is small enough to be transported and installed by a single user. The board arrangement 10 may be constructed such that the length of a single modular unit is typically less than twelve feet. For example, the board arrangement 10 may include any number of units offered in a variety of lengths such as four feet, five feet, six feet, and eight feet to accommodate user needs/preferences.

A unit of the board arrangement 10 comprises a board 12 and a frame 14. Some embodiments also comprise a tray 16 extending from the lower surface of the frame 14. The board 12 may be, for example, a chalkboard, white board (for use with erasable markers), corkboard, tack board, metallic sheet (for receiving magnets), boards having one or more pockets or bins attached thereto, or combinations of such boards (e.g. a tack board with a dry write surface). One of ordinary skill in the art would recognize that any suitable form of board media could be used. In certain embodiments, the board arrangement 10 may be mountable to a wall. In other embodiments, the board arrangement 10 may have or be attached to one or more support members capable of supporting the board arrangement 10 away from a wall. Insofar as any portion of this disclosure refers to placement against a wall, but not a support, it will be appreciated that the same principles apply to assembly of the board arrangement on support members, i.e., separate from a wall, and nothing in this disclosure or the claims should limit the invention to placement only against a wall.

Figure 12:
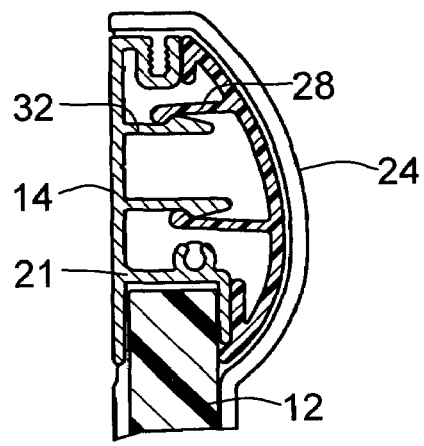
FIG. 12 is a fragmentary cross-sectional view from the side at the top corner of the board unit as shown in FIGS. 8 and 10.
Figure 13:
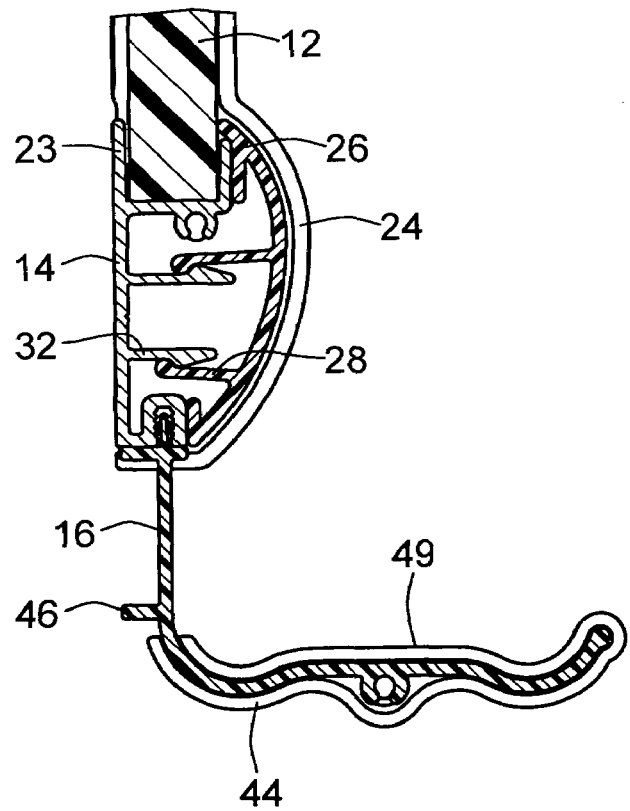
FIG. 13 is a fragmentary cross-sectional view from the side at the bottom corner of the board unit and tray of FIGS. 9 and 11.

In order to support the board arrangement in position, the board arrangement 10 comprises a frame 14 that supports the board 12 when the board arrangement 10 is assembled and mounted to a wall, support members, or other structure. The frame 14 comprises a top frame member 20, a bottom frame member 22, and two side frame members 24. By way of example and not limitation, as shown in FIGS. 12 and 13, the top and bottom frame members 20, 22 may have a channel 21, 23, respectively, for receiving and retaining a board 12. The top and bottom frame members 20, 22 may be mounted to a wall and the board 12 may be slidably inserted between these two frame members such that the bottom frame member 22 supports the board 12 vertically, and both the top and bottom frame members 20, 22 prevent the board 12 from moving horizontally in a direction perpendicular to the wall. Alternately, the bottom frame member 22 may be attached to a support structure, and the board 12 may be lowered into the channel 23. The top frame member may then be placed on top of the board and secured to a support structure. Although the top and bottom frame members 20, 22 are illustrated as elongated members, it will be appreciated that each of these frame members may alternately include one or more smaller frame members, so long as the board is adequately supported. Moreover, the frame members 20, 22 may be of any desired material and by any desired method, so long as the structure is sufficiently strong to support the board 12. In a current embodiment, the frame members 20, 22 are aluminum, which may be extruded or cast aluminum. Alternately, for example, they may be formed of a polymeric material, such as polyvinyl chloride (PVC).

Figure 7:
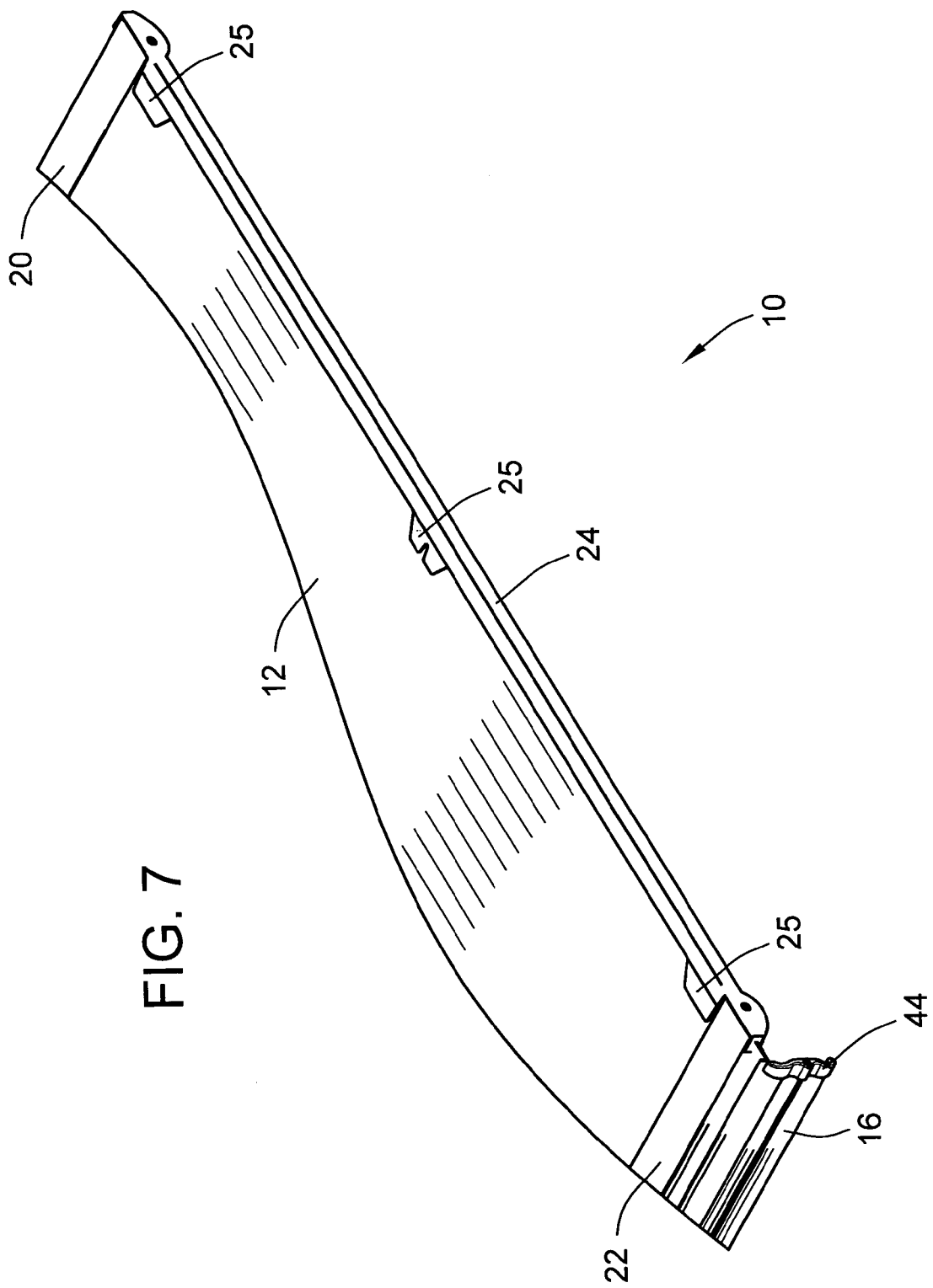
FIG. 7 is a fragmentary perspective view from behind of the board arrangement of FIGS. 1-6.
Figure 10:
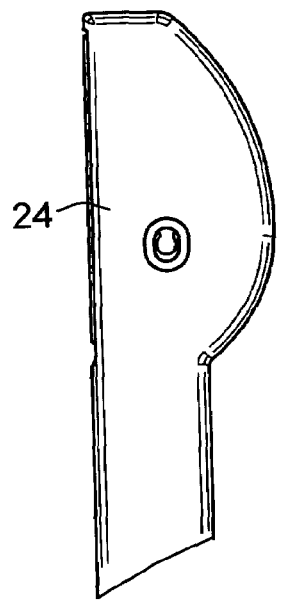
FIG. 10 is a fragmentary side view of a transition piece at the top corner of the board unit, as shown in FIG. 8.
Figure 11:
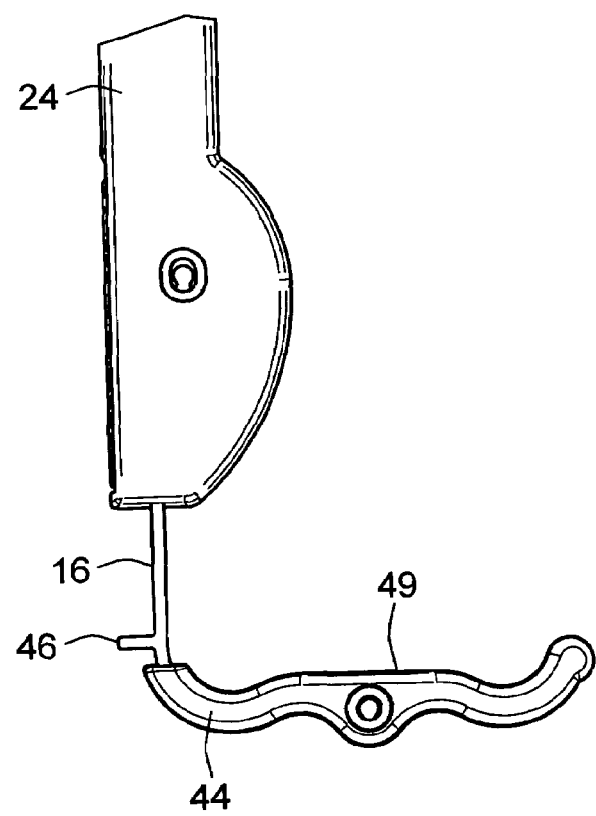
FIG. 11 is a fragmentary side view of a side member at the bottom corner of the board unit and tray, as shown in FIG. 9.

As shown in FIGS. 10 and 11, once the board 12 is in place between the mounted top and bottom frame members 20, 22, one or more side frame members 24 may be provided for covering the side edges of the board 12, to prevent the board 12 from being removed, and/or to provide additional support for the board 12. As shown, the side frame members 24 may connect the top frame member 20 to the bottom frame member 22. As shown in FIGS. 7-9, the side frame members 24 may have one or more tabs 25 that help to assist with the installation of the side frame members 24. The tabs 25 may be tapered to serve as a lead for maneuvering the side frame member 24 between the board 12 and the wall when attaching the side frame members 24 to the board arrangement 10. The tabs 25 additionally resist movement and/or deflection of the board 12 when pressing against the board 12 and provide additional support for the board 12 should the user decide to carry the board while it is connected to the frame 14. In assembly, the user may utilize the one or both of the side frame members 24 as spacing guides for placement of the top and bottom frame members 20, 22. If two side frame members 24 are so utilized during assembly, however, it will be appreciated that, once the top and bottom frame members 20, 22 are mounted, one of the side frame members 24 must be removed to permit placement of the board 12 between the top and bottom frame members 20, 22.

Figure 5:
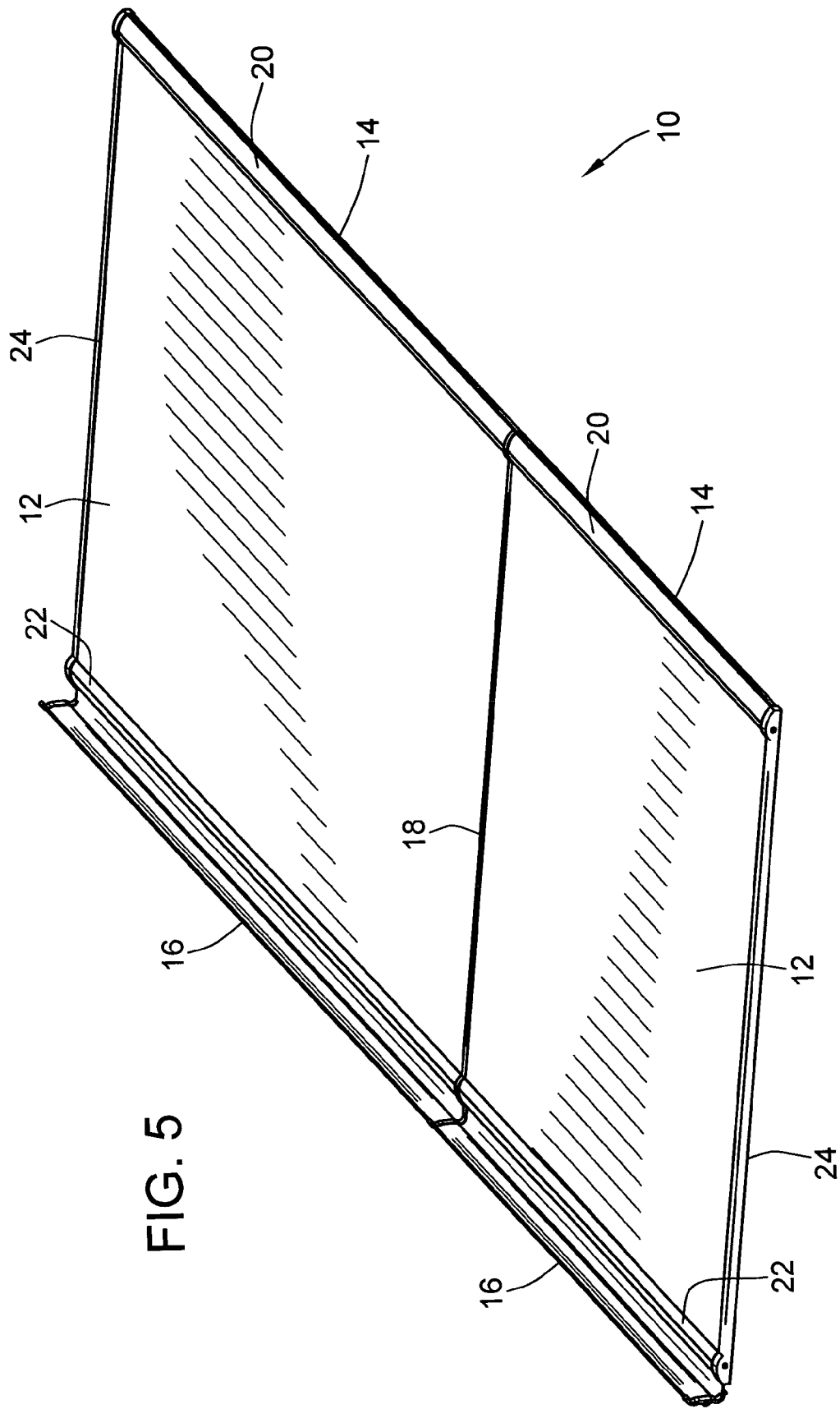
FIG. 5 is a perspective view from the front of a board arrangement including multiple boards constructed in accordance with teachings of the invention.
Figure 6:
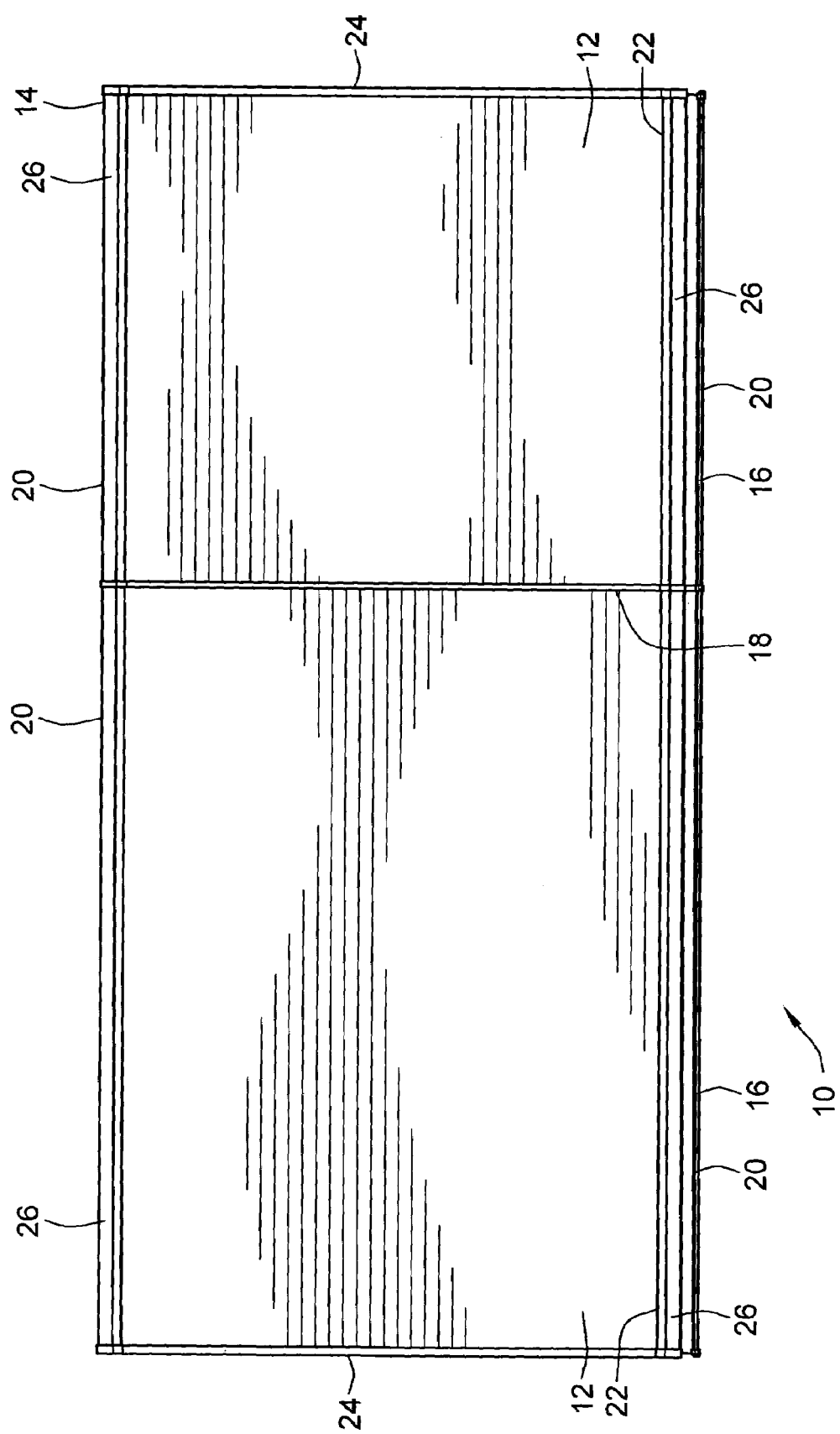
FIG. 6 is a front elevational view of the board arrangement of FIG. 6.

According to a feature of the invention, the board arrangement 10 is expandable to permit a user to construct a board arrangement 10 of a desired length. Even though each individual board 12 and frame 14 unit is relatively shorter in length than most boards used in schools and universities, for example, the board arrangement is expandable by the user to equal or exceed the length of current boards. The board arrangement 10 is able to provide a continuous transition between boards 12 through a shared vertical attachment. In accordance with the teachings of the invention, as shown in FIGS. 5 and 6, the board arrangement 10 may comprise multiple board 12 and frame 14 units adjacently disposed.

When more than one board 12 is used, a transition piece/frame member 18 may be placed between the adjacent boards 12, which provides a support bridge between the two boards 12 and hides the intersection of the two boards 12 for aesthetic reasons. A1

Figure 23:
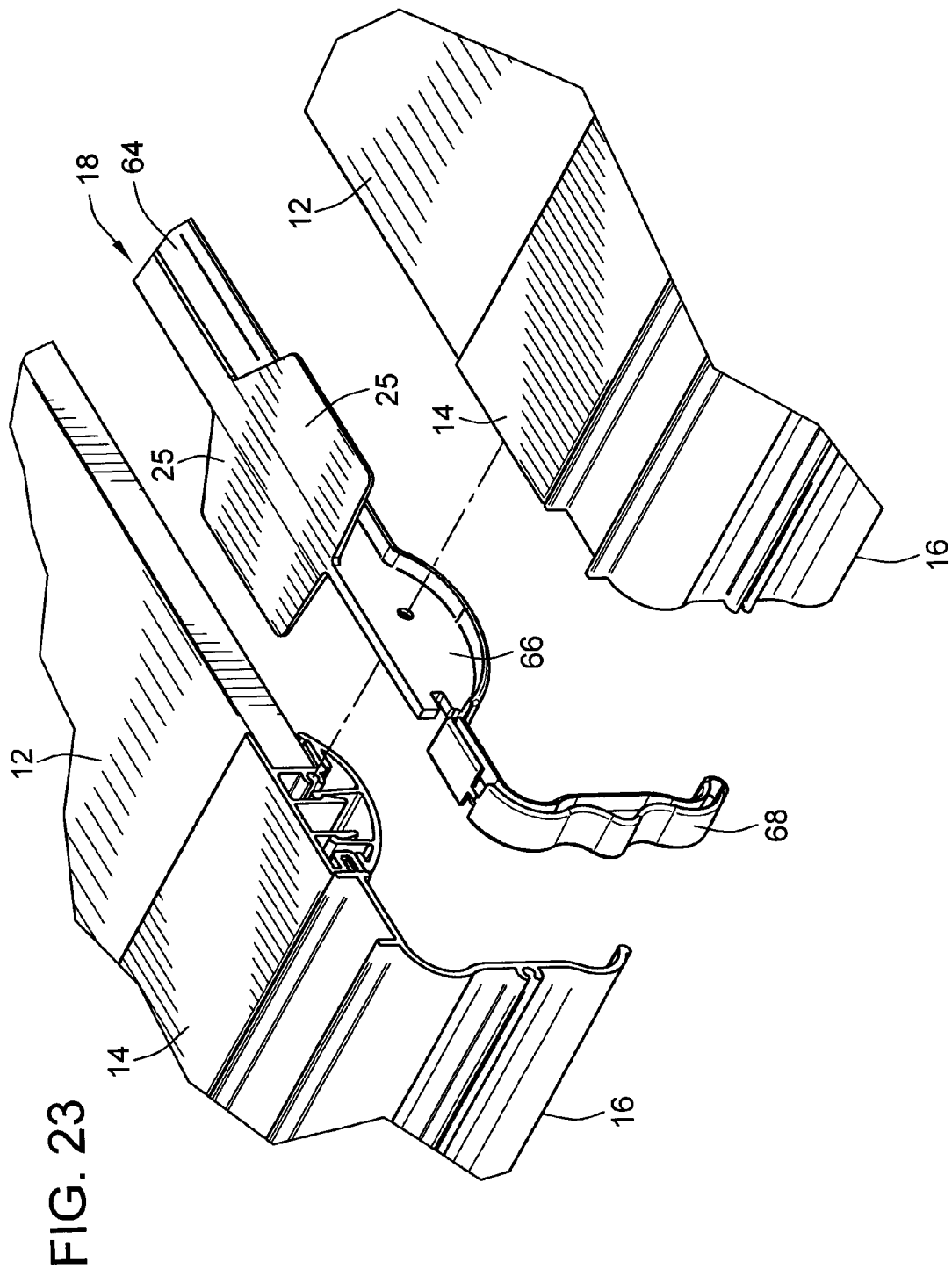
FIG. 23 is an exploded fragmentary perspective view from behind of the bottom of a transition piece in accordance with the teachings of the invention.
Figure 24:
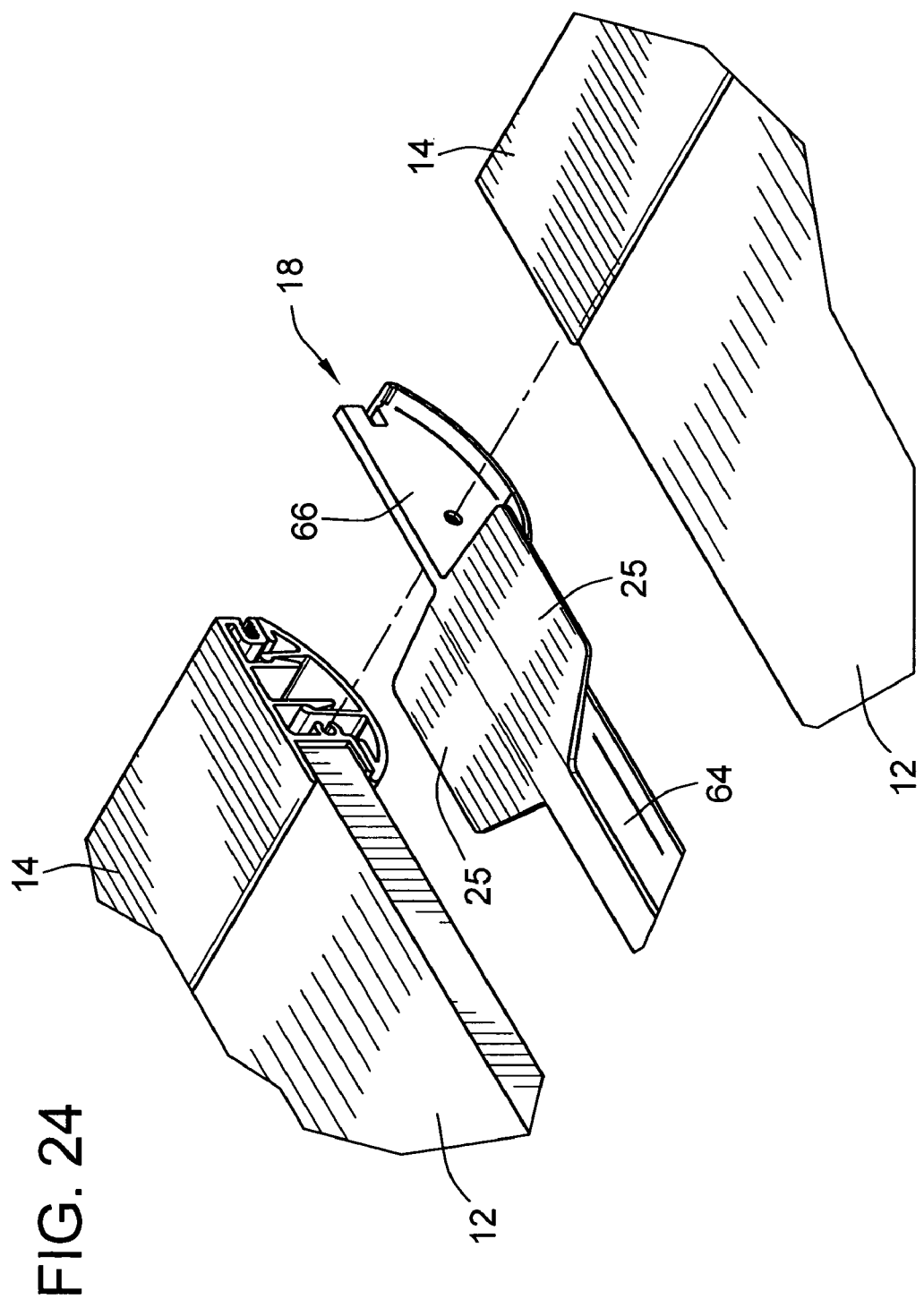
FIG. 24 is an exploded fragmentary perspective view from behind of the top of the transition piece of FIG. 23.

Turning to FIGS. 23 and 24, the transition piece 18 may comprise oppositely facing board receiving portions 64 and upper and lower oppositely facing frame receiving portions 66 for receiving a board 12 and a frame 14, respectively. In embodiments having a tray 16, the transition piece may include oppositely facing tray receiving portions 68 for receiving the tray 16. These respective receiving portions allow for secure and level placement of two board 12 and frame 14 units adjacent to one another. The transition piece 18 may additionally comprise tabs 25 as described above. The transition piece 18 may be constructed of a material that permits erasable writing thereon, such that the transition piece will not interrupt the ability to continuously write from one board to the next. Alternately, the transition piece may be a desired color or have a desired design displayed thereon depending on user preference.

The modular capability of the board arrangement 10 allows a user to add additional boards 12 after initial installation without the need for removing any boards 12 already installed. Just as a user may add additional boards 12 later, the user may alternately decide to remove one or more boards 12 at a later time after initial installation should damage occur to any board, the user's preferences change, or the user decides to reduce the size of the board arrangement 10. Thus, the board arrangement 10 is both expandable and retractable to different sizes without damaging the board arrangement 10.

The modular capability of the board arrangement 10 also allows a user to mix and match board sizes. By way of example and not limitation, a user may want to substantially fill the entire length of a 15 foot wall. In order to meet the user's needs, the user could easily place an 8 foot modular board arrangement adjacent to a 6 foot modular board arrangement to substantially cover this length. Both of these boards would be relatively easy to transport and install compared to current boards. The user is able to select from a number of boards 12 of desired lengths such that the user can combine the boards 12 to obtain a board arrangement length that suits the user's needs and/or preferences.

Although the board arrangement 10 having more than one board adjacently disposed is depicted as a horizontal arrangement with the sides of respective boards 12 adjacently disposed to one another, the board arrangement may additionally or alternately include boards 12 disposed above and/or below an adjacent board 12. By way of example and not limitation, a user may desire a bulletin board disposed above a marker board. In this arrangement, each board would have independent side frame members 24, the bulletin board would have a top frame member 20, and the marker board would have a bottom frame member 22. A transition piece 18 would be disposed horizontally between the bulletin board and the marker board. Depending on user preference, the boards 12 may have different heights and/or lengths regardless of whether the board arrangement 10 is disposed horizontally, vertically, or a combination of both.

Figure 14:
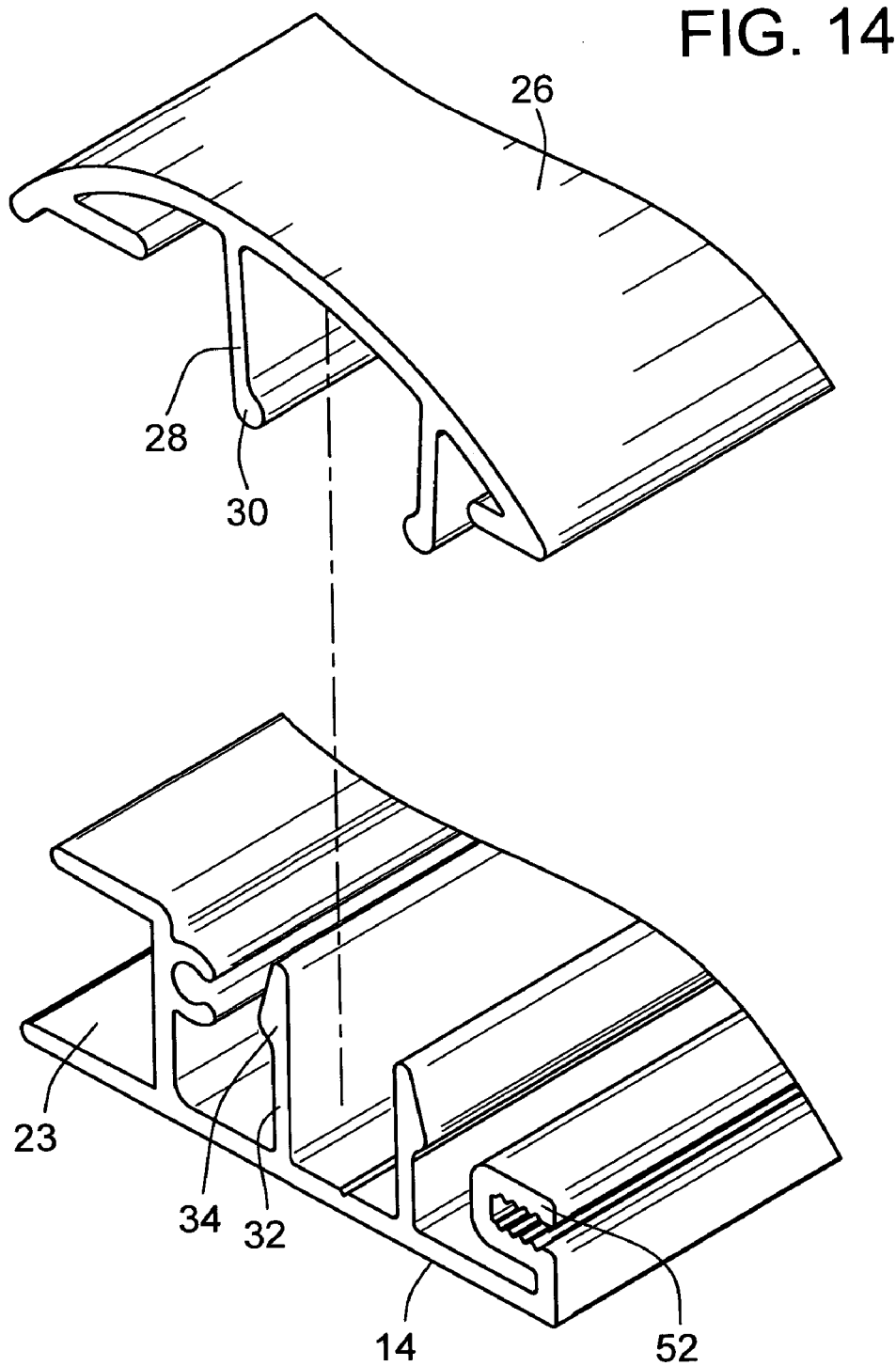
FIG. 14 is an exploded fragmentary perspective view of an embodiment of a frame and face plate for the board arrangement of FIGS. 1-7 constructed in accordance with teachings of the invention.
Figure 15:
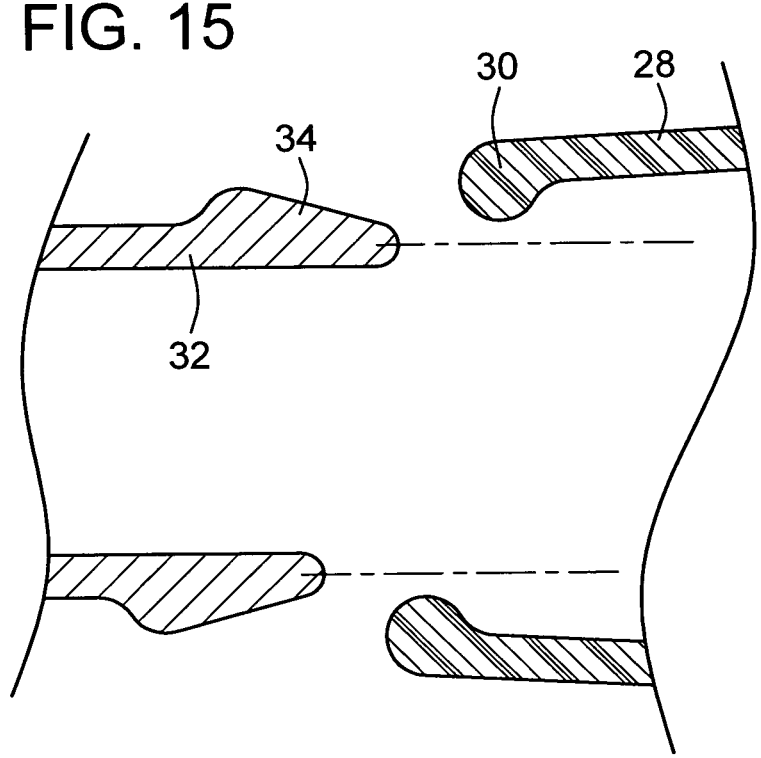
FIG. 15 is an exploded side cross-sectional view of the frame and face plate of FIG. 14.
Figure 16:
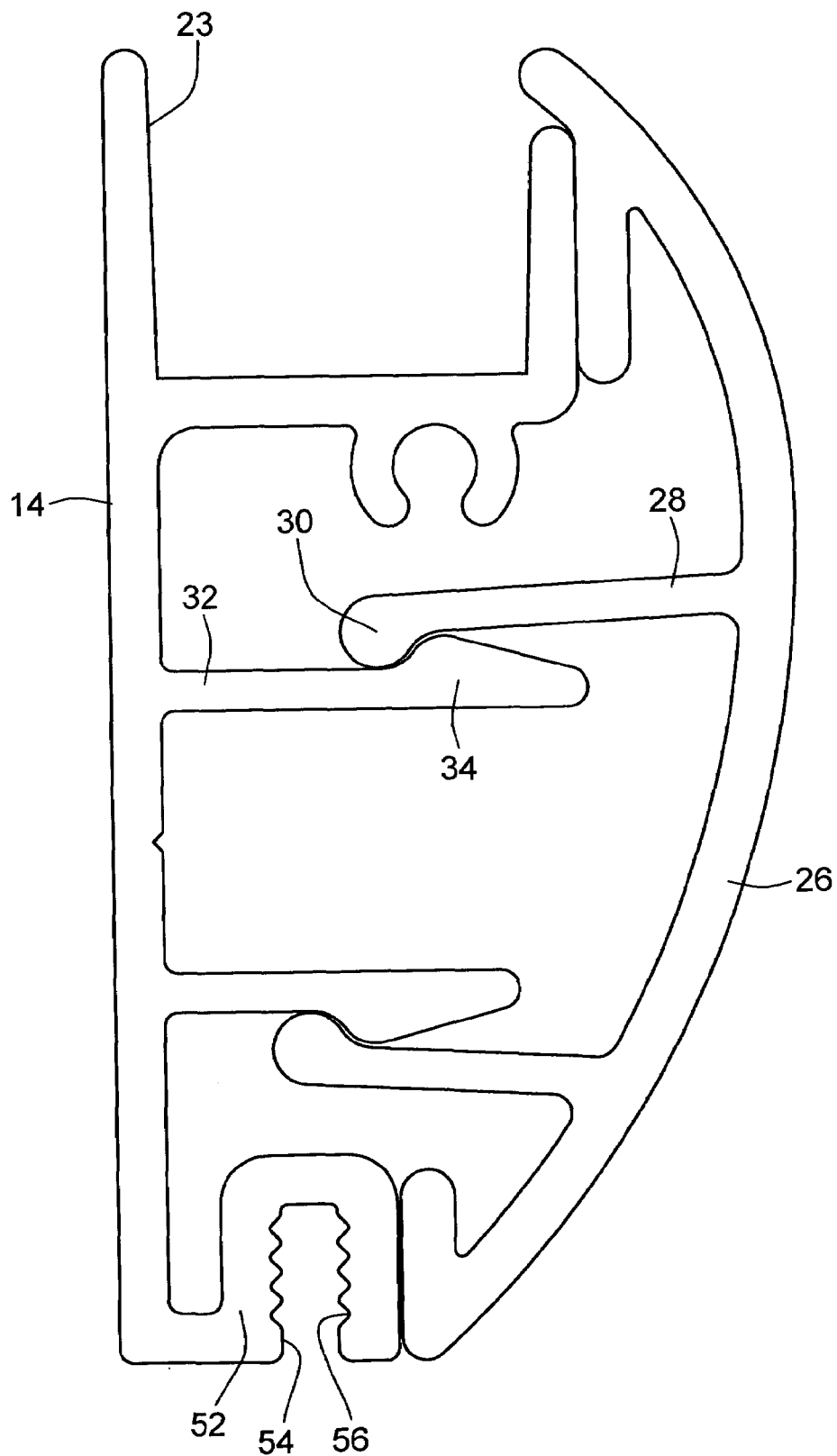
FIG. 16 is a side view of the frame and face plate of FIGS. 14 and 15 in engagement.

Embodiments of the invention provide the ability for users to choose the appearance of the frame 14. As shown in FIGS. 14-16, a face plate 26 may be provided that can be attached to the frame 14. As best shown in FIG. 16, the face plate 26 is mounted to a front side of the frame 14 and is sized and configured to cover the entire front side of the frame member to which it is mounted, thereby concealing the frame member from view when viewed from a direction normal to the support structure. The face plate 26 may be of a particular material, of a particular color, have a printed media thereon (such as a paper with a desired pattern or design), or be writable thereon. For example, the face plate 26 may have a wood grain design placed on the face plate 26 to give the appearance that the face plate 26 is made of wood. Alternately, the face plate 26 may be constructed of a metal, such as aluminum, that has been anodized to make the face plate 26 a desired color. The face plate 26 may be constructed of polyvinyl chloride (PVC), aluminum, or any other suitable material known in the art. Although it may be preferable for the face plate 26 to be removable from the frame 14 in some embodiments, other embodiments may have a face plate 26 that is fixed to the frame 14. The face plate 26 is shown as attaching to the top and bottom frame members 20, 22, but not the side frame members 24. In certain embodiments, however, the side frame members 24 may also have a fixed or detachable face plate 26.

The frame 14 and the face plate 26 have an interconnecting structure such that the face plate 26 is securely attachable to the frame 14 and easily removable from the frame 14. Such structure makes initial installation quick and straightforward. Such structure also allows a user to change the face plate color or design after initial installation without needing to remove the entire frame 14 or purchase an entirely new board arrangement 10 to change color or designs. By way of example, a school teacher may want orange and black face plates 26 during the months leading up to Halloween, but green and red face plates 26 during the months leading up to the winter holidays. The teacher may easily remove the current face plate with another having a different design for a different season. In professional training centers, designers may desire a certain faceplate appearance that coordinates with the interior of the room or facility.

As shown in FIGS. 14-16, the face plate 26 may have one or more extension members 28 extending from the rear of the face plate 26. The face plate extension members 28 have a bulbous portion 30 disposed near the distal end of the extension member 28. The frame 14 similarly has one or more extension members 32 extending from the front of the frame 14. The frame extension members 32 have a half arrowhead shaped portion 34 near the distal end of the extension member 32 (i.e., the extension members 32 may have a thickness near the distal end that is larger than the thickness at the proximal end). The face plate 26 is attached to the frame 14 by either snapping the face plate 26 on the frame 14 or sliding the face plate 26 onto the frame 14 from one end. In some embodiments, the frame 14 is constructed of a material such as aluminum and the face plate 26 is constructed of a material such as polyvinyl chloride (PVC). When the face plate 26 is snapped onto the frame 14, the extension members 28 of the face plate 26 deflect slightly as the bulbous portion 30 moves across the half arrowhead shaped portion 36 of the extension members 32 of the frame 14. Once the bulbous portion 30 passes beyond the half arrowhead portion 36, the extension members 28 of the face plate 26 are no longer deflected and the backside of the half arrowhead portion 34 prevents the face plate 26 from being removed by a force applied perpendicular to the front of the face plate 26. In order to remove a face plate 26, the user may slide the face plate 26 out of the frame 14, or the user may apply a force to deflect the extension member 28 of the face plate 26 such that the bulbous portion 30 is no longer retained by the half arrowhead portion 34 and the face plate 26 may be pulled away from the frame 14.

Figure 17:
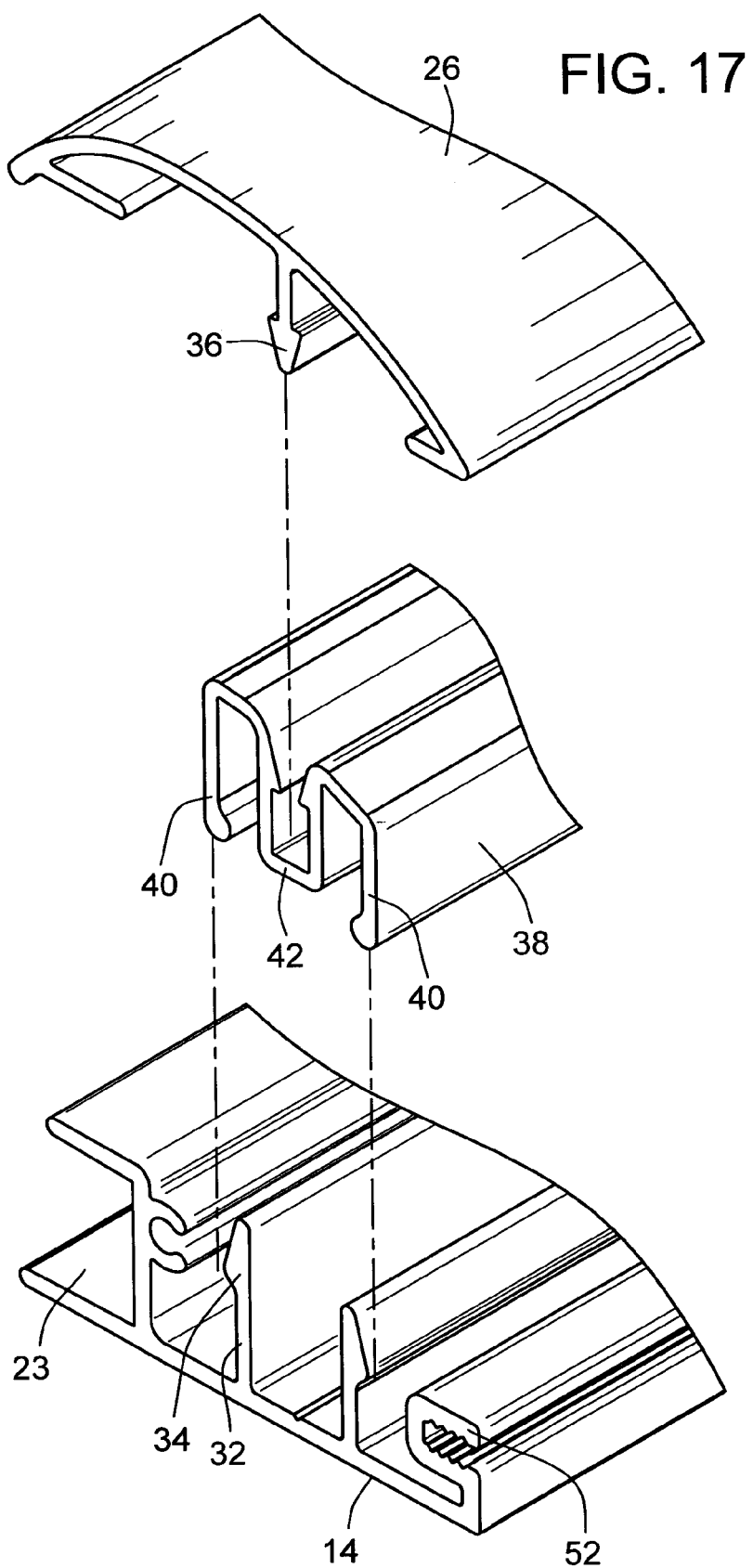
FIG. 17 is an exploded cross-sectional perspective view an alternate embodiment of a frame and face plate for the board arrangement of FIGS. 1-7 in accordance with teachings of the invention.
Figure 18:
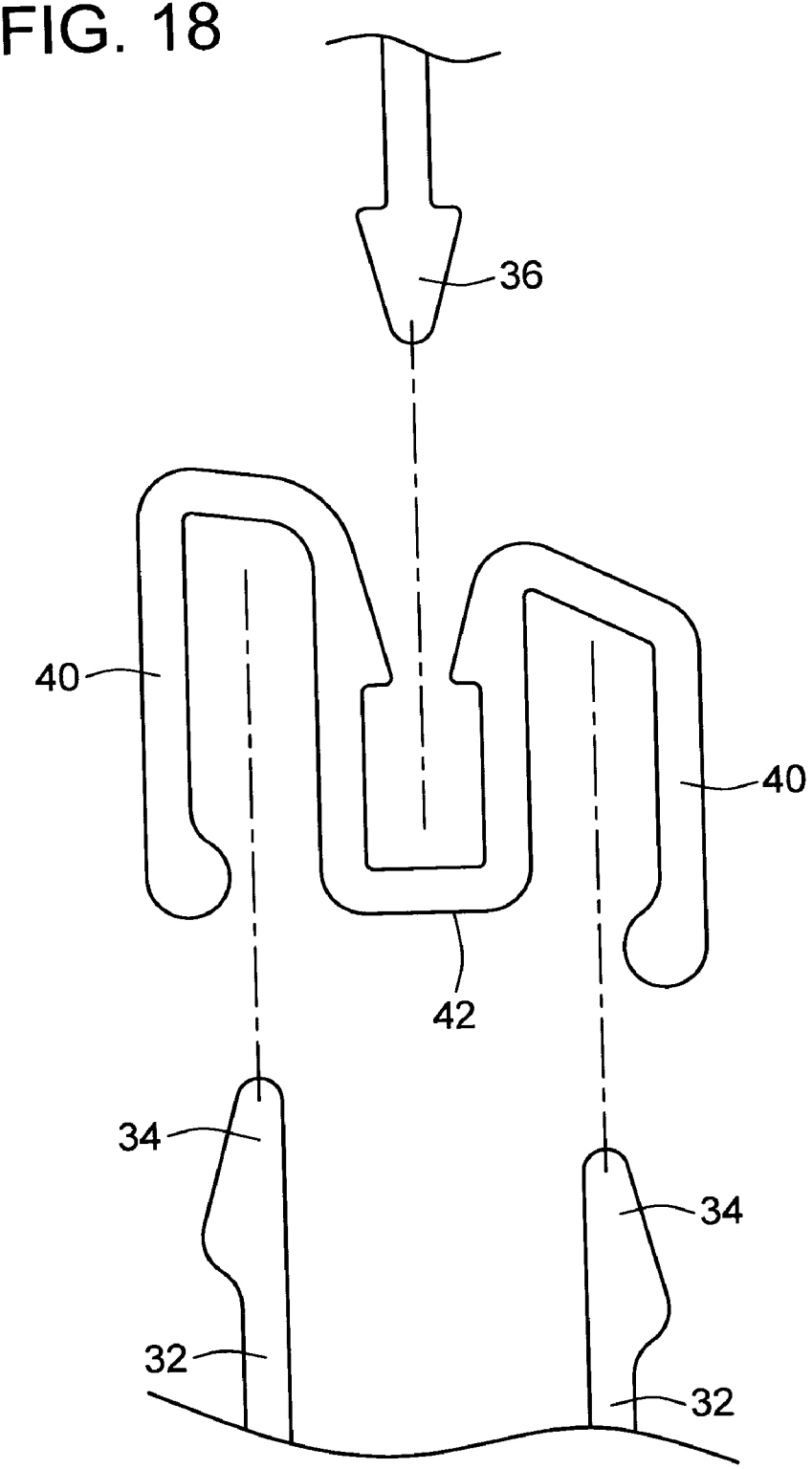
FIG. 18 is an exploded fragmentary side view of the frame and face plate of FIG. 17.
Figure 19:
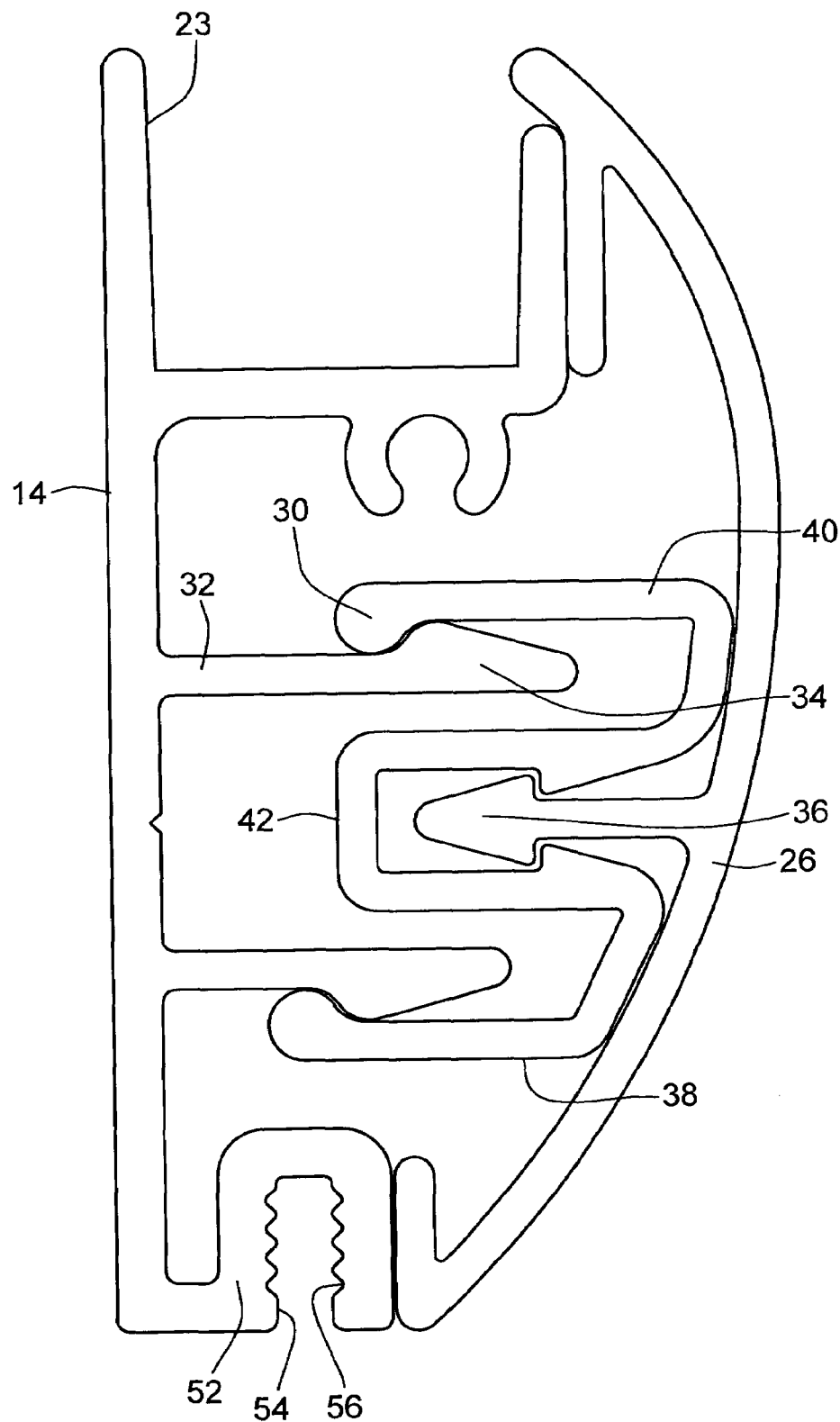
FIG. 19 is a side view of the frame and face plate of FIGS. 17 and 18 in engagement.

In some embodiments, it may be desirable to have a face plate 26 constructed of a metal, such as aluminum. When a metal face plate 26 is used, it may be desirable in some embodiments to use an alternate interconnection structure, such as is shown in FIGS. 17-19. In these embodiments, the face plate 26 has an extension member 36 having an arrowhead shape near the distal end of the extension member 36. An intermediate M-shaped piece 38 is interposed between the frame 14 and the face plate 26. The legs 40 of the M-shaped piece 38 are similarly shaped as the extension members 28 of the face plate 26 in the previously described embodiment shown in FIGS. 14-16. Turning back to FIGS. 17-19, the center portion 42 of the M-shaped piece 38 receives and retains the face plate extension member 36. In certain embodiments, this M-shaped piece 38 would be constructed of PVC or other suitable material capable of deflecting slightly to receive the respective extension members 36, 32 of the face plate 26 and the frame 14.

Figure 21:
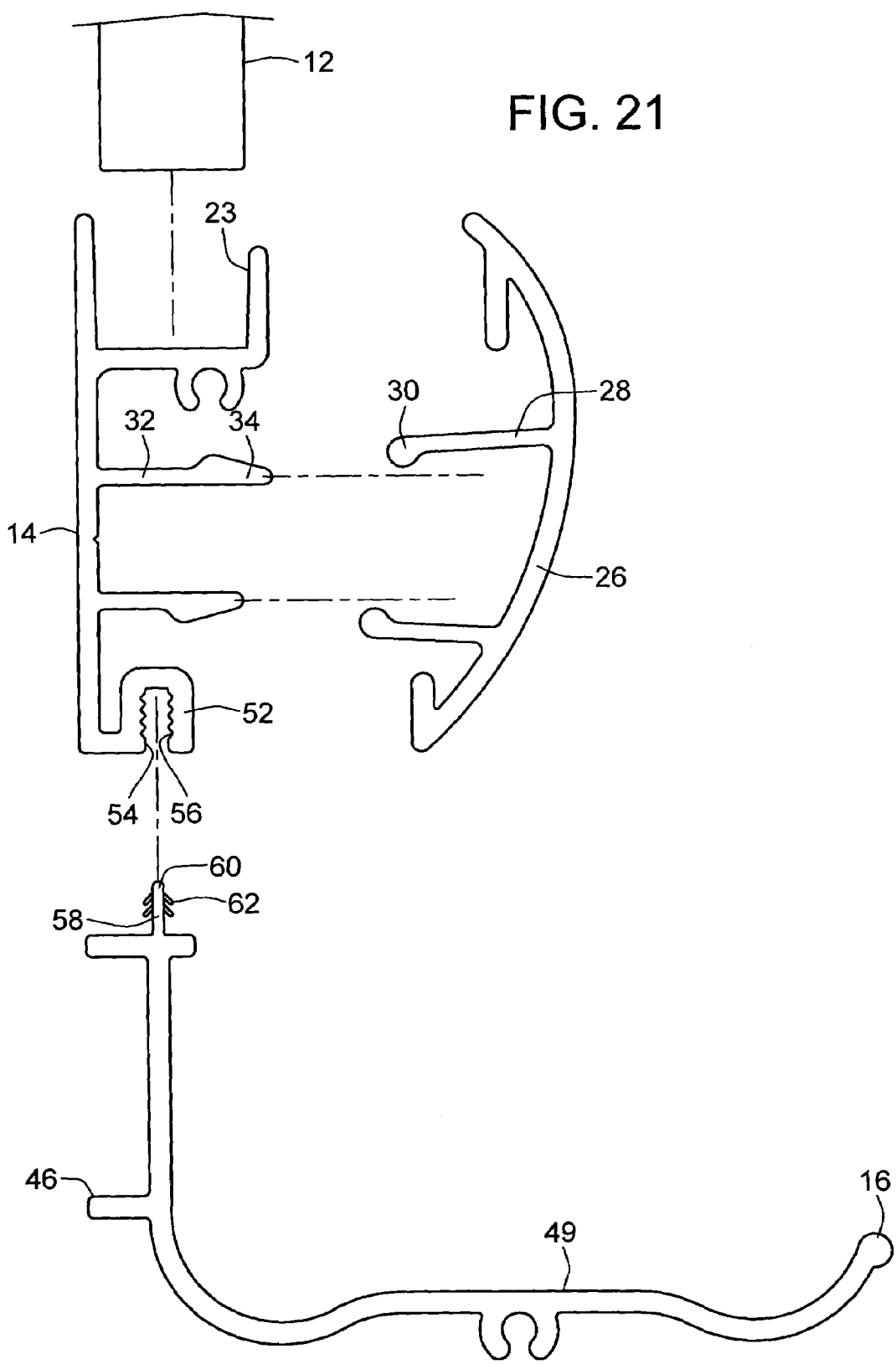
FIG. 21 is a fragmentary exploded side view of a board, frame, face plate, connector and tray in accordance with the teachings of the invention.
Figure 22:
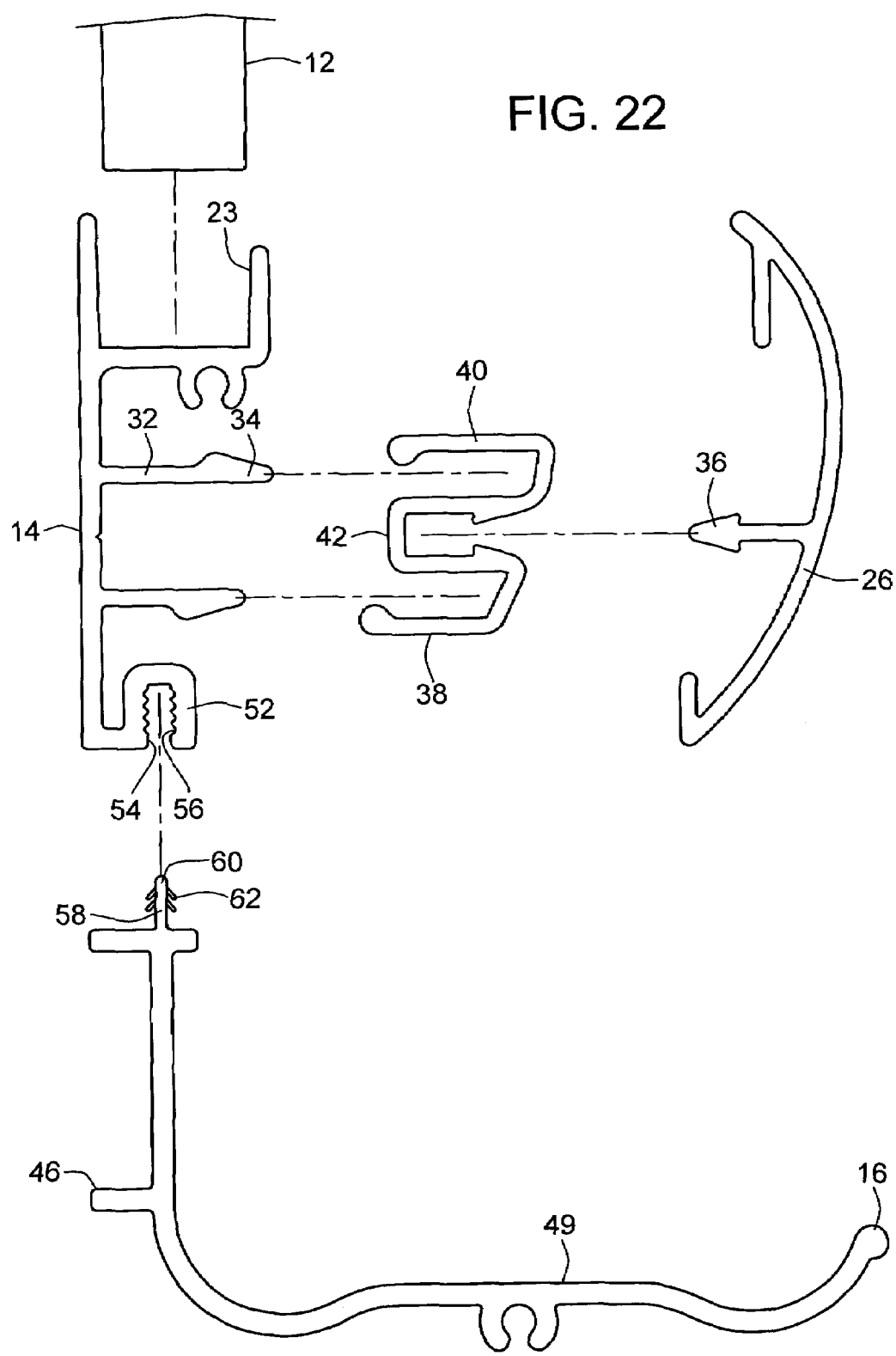
FIG. 22 is a fragmentary exploded side view of another board, frame, face plate, connector, and tray in accordance with the teachings of the invention.

It is desirable in some embodiments to have the capability to attach objects to any of the frame members of the frame 14 of the board arrangement 10. According to a feature of the invention, as shown in FIGS. 21 and 22, a tray 16 for holding items such as markers, chalk, erasers, etc. may be attached to the board arrangement 10. Turning back to FIGS. 7, 9, and 11, the tray 16 may include end caps 44 that prevent items from sliding off of the tray 16. The end caps 44 also provide a cover for the edge of the tray 16 that may help prevent injury when a user bumps into the edge of the tray 16. The tray 16 may have a tray stabilizing portion 46 that helps to retain the base 49 of the tray 16 substantially perpendicular to the face of the board 12 even when relatively heavy items are placed on the tray 16. The tray 16 may also have a channel 48 that is adapted to receive a portion of the side frame members 24 to provide further support for the tray 16. Other objects may be similarly attached to portions of the frame 14, such as a map rail, flag holder, etc.

Figure 20:
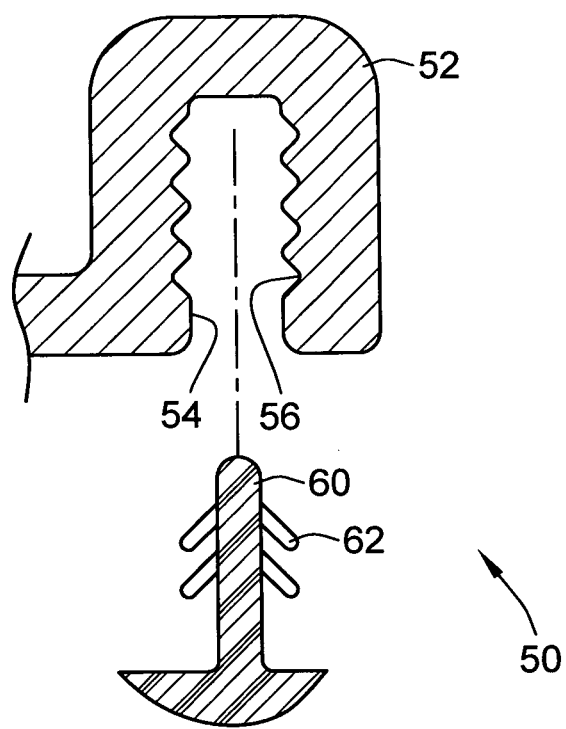
FIG. 20 is an exploded cross-sectional view of a connector in accordance with the teachings of the invention.

It is desirable to have a connection between the board arrangement 10 and an object being attached to the board arrangement 10 that makes the object easy to install, securely attached, and removable without damaging the object or the board arrangement 10. In accordance with the teachings of the invention, there is shown in FIGS. 20-22, a connector 50 having a receiving portion 52 an insertion portion 58. The receiving portion 52 comprises a channel 54 having one or more detents 56. The detents 56 are parallel with the length of the channel 54 and are disposed along at least a portion of the length of the channel 54. As shown, there are eight detents 56 disposed along the entire length of the channel 54. The insertion portion 58 comprises a flange 60. The flange 60 is disposed substantially perpendicular to the base 49 of the tray 16. The flange 60 comprises one or more elongated teeth 62 extending therefrom. As shown, there are four teeth 62 that extend the length of the flange 60. One of ordinary skill in the art would appreciate that the detents 56 and teeth 62 may be other lengths other than the length of the channel 54 and flange 60, respectively.

In some embodiments, as shown, the teeth 62 are disposed at an angle approximately 45° from the flange 60. Each tooth 62, however, may be disposed at any one angle between 0° and 90° relative to the flange 60. The teeth 62 are constructed of a material that is relatively softer than the detents 56. By way of example and not limitation, the detents 56 may be made of aluminum and the teeth 62 may be made of a soft PVC.

The insertion portion 58 may be inserted into the receiving portion 52 either by sliding the insertion portion 58 into a side of the receiving portion 52 in a direction parallel with the length of the channel 54, or the insertion portion 58 may be inserted into the receiving portion 52 by applying a force perpendicular to the length of the channel 54. When the latter insertion method is used, the softer teeth 62 deform slightly to allow the teeth 62 to pass beyond the detent 56. Once a tooth 62 has passed a detent 56, the tooth 62 fills a portion of the space in the detent 56, which retains the object being attached to the board arrangement 10. The tray 16 may be removed in some embodiments if sufficient force is applied perpendicular to the length of the channel 54. Alternately, just as the tray 16 may be inserted by sliding the insertion portion 58 into the receiving portion 52, the tray 16 may similarly be removed by sliding the tray 16 out of the receiving portion 52.

Although, the connection is described and shown with respect to a tray, one of ordinary skill in the art would appreciate that the connection could be used to attach other objects, such as a flag holder or a map rail having a map that may be unrolled from a cylinder, to the board arrangement. The detents 56 in the receiving portion 52 may also be used to attach objects to the frame 14 using a screw, such as a self-tapping screw, without needing to drill holes into the frame 14 or wall to accommodate such screws. It will also be appreciated that the receiving portion 52 may contain the teeth 62 and the insertion portion 58 may contain the detents 56.

The following example further illustrates the invention but, of course, should not be construed as in any way limiting its scope. As described above, the modular board arrangement 10 comprises a plurality of component parts that may be assembled on-site. When assembling a board arrangement 10 comprising multiple boards 12, an installer may, for example, assemble each board with its respective frame 14 and then mount to a wall, or the installer may mount portions of the frame 14 to the wall and lower or slide the board 12 into the frame 14. More specifically, the installer may assemble the top frame member 20, bottom frame member 22, a side frame member 24, and a transition piece 18 to the first board 12. Similarly, the top frame member 20, bottom frame member 22, and one side frame member 24 may be assembled to the second board 12. The first board 12 and frame 14 unit may then be mounted to the wall. The second board 12 and frame 14 unit is subsequently attached to both the wall and the transition piece 18, thus connecting the first board 12 with the second board 12 and completing the board arrangement 10.

Alternately, as discussed above, portions of the frame 14 may first be mounted to the wall using the side frame members 24 as spacing guides. A transition piece 18 may similarly be used as a spacing guide in arrangements having multiple boards 12. When assembling an arrangement having two boards 12, for example, a side frame member 24 and the transition piece 18 may be used to space the top frame member 20 and the bottom frame member 22 the desired distance away from each other to accommodate each board 12. Once the respective top and bottom frame members 20, 22 are mounted for each board 12 and the transition piece 18 is in place in between the respective frames 14, the side frame member 24 for each board may be removed to allow each board 12 to slide into place. Finally, the side frame members 24 for each board 12 are reattached to complete the board arrangement 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A modular board kit for constructing a board assembly of a desired length on a support structure on location, the kit comprising:
    a plurality of boards, each of the boards comprising at least first and second horizontal edges, and at least first and second vertical edges;
    a plurality of horizontal frame members for mounting to the support structure in a substantially horizontal manner, each horizontal frame member comprising a horizontal frame member receiving portion adapted to receive a respective one of the first and second horizontal edges of a single one of said boards to support the plurality of boards in series from a first board to a last board;
    a pair of vertical frame members for mounting to the support structure in a substantially vertical manner, a first vertical frame member of the pair of vertical frame members adapted to be disposed adjacent a first vertical edge of the first board, and a second vertical frame member of the pair of vertical frame members adapted to be disposed adjacent a second vertical edge of the last board; and
    at least one transition piece adapted to couple an adjacent two of the plurality of boards in series, the at least one transition piece comprising oppositely facing board receiving portions and oppositely facing horizontal frame member receiving portions, such that when the at least one transition piece is positioned between the adjacent two of the plurality of boards in series, each oppositely facing board receiving portion is adapted to receive a respective vertical edge of one of the adjacent two of the plurality of boards in series, and each oppositely facing horizontal frame member receiving portion is adapted to receive a respective horizontal frame member;
    whereby the plurality of boards, the at least one transition piece, and the vertical and horizontal frame members may be utilized to construct a board assembly of the desired length on the support structure on location.

2. The modular board kit of claim 1 wherein the length of each of the plurality of horizontal frame members and the length of each of the plurality of vertical frame members are less than twelve feet.

3. The modular board kit of claim 1 further comprising an accessory attachment portion.

4. The modular board kit of claim 3 wherein the accessory attachment portion comprises a channel having at least one detent disposed within the channel.

5. The modular board kit of claim 3 wherein the accessory attachment portion comprises a flange having at least one flexible elongated tooth extending from the flange.

6. The modular board kit of claim 1 further comprising an accessory adapted for attachment to at least one horizontal frame member or vertical frame member.

7. The modular board kit of claim 6 wherein the accessory comprises at least one of a tray, a map rail, and a flag holder.

8. The modular board kit of claim 1 further comprising at least one face plate adapted for mounting to at least one horizontal frame member or vertical frame member.

9. The modular board kit of claim 8 wherein the at least one horizontal frame member or vertical frame member to which the face plate is mounted further comprises a front side, and at least one extension member extending from the front side, the face plate being removably mountable to the at least one extension member.

10. The modular board kit of claim 8, wherein the at least one horizontal frame member or vertical frame member to which the face plate is mounted further comprises a front side, the face plate being sized and configured to cover the entire front side, thereby concealing the at least one horizontal frame member or vertical frame member to which the face plate is mounted from view.

11. The modular board kit of claim 1 wherein at least a portion of at least one of the horizontal frame members is disposed subjacent to at least a portion of at least one of the vertical frame members.

12. The modular board kit of claim 1, wherein the at least one transition piece further comprises tabs adapted to be positioned between the support structure and at least one of the adjacent two of the plurality of boards in series.

13. The modular board kit of claim 1, further comprising a tray coupled with at least one of the horizontal frame members, and wherein the at least one transition piece further includes a tray receiving portion for receiving the tray.

14. A method of assembling a modular board assembly to a support structure on location, the method comprising:
    attaching a first horizontal frame member and a second horizontal frame member to the support structure such that the first horizontal frame member and the second horizontal frame member are substantially parallel with one another, the first horizontal frame member having a first horizontal frame member receiving portion adapted to be disposed adjacent to a single board, the second horizontal frame member having a second horizontal frame member receiving portion adapted to be disposed adjacent to a single board;
    disposing a first board between the first horizontal frame member and the second horizontal frame member such that the first board is disposed within the first horizontal frame member receiving portion and the second horizontal frame member receiving portion;

disposing a first vertical frame member adjacent to a first vertical edge of the first board such that the first vertical frame member is substantially perpendicular to the first horizontal frame member and the second horizontal frame member;

disposing a transition piece adjacent to a second vertical edge of the first board such that the transition piece is substantially perpendicular to the first horizontal frame member and the second horizontal frame member;

attaching a third horizontal frame member and a fourth horizontal frame member to the support structure such that the third horizontal frame member and the fourth horizontal frame member are substantially parallel with one another and substantially aligned with the first and second horizontal frame members, the third horizontal frame member having a third horizontal frame member receiving portion adapted to be disposed adjacent to a single board, the fourth horizontal frame member having a fourth horizontal frame member receiving portion adapted to be disposed adjacent to a single board;

disposing a second board between the third horizontal frame member and the fourth horizontal frame member such that the second board is disposed within the third horizontal frame member receiving portion and the fourth horizontal frame member receiving portion, and such that a first vertical edge of the second board is adjacent to the transition piece; and disposing a second vertical frame member adjacent to a second vertical edge of the second board such that the second vertical frame member is substantially parallel to the first vertical frame member and the transition piece;

wherein the transition piece includes oppositely facing board receiving portions, upper oppositely facing horizontal frame member receiving portions, and lower oppositely facing horizontal frame member receiving portions, such that when the at least one transition piece is positioned between the first and second boards, a first one of the oppositely facing board receiving portions receives the second vertical edge of the first board and a second one of the oppositely facing board receiving portions receives the first vertical edge of the second board, a first one of the upper oppositely facing horizontal frame member receiving portions receives the first horizontal frame member and a second one of the upper oppositely facing horizontal frame member receiving portions receives the third horizontal frame member, and a first one of the lower oppositely facing horizontal frame member receiving portions receives the second horizontal frame member and a second one of the lower oppositely facing horizontal frame member receiving portions receives the fourth horizontal frame member.

15. The method of claim 14 further comprising attaching a face plate to at least one of the first horizontal frame member, the second horizontal frame member, the third horizontal frame member, the fourth horizontal frame member, the first vertical frame member, the second vertical frame member, and the transition piece.

16. The method of claim 15, wherein a face plate is attached to each of the horizontal frame members such that once assembled, the face plates conceal the horizontal frame members from view when viewed from a direction normal to the support structure.

17. The method of claim 14 further comprising attaching an accessory to at least one of the first horizontal frame member, the second horizontal frame member, the third horizontal frame member, the fourth horizontal frame member, the first vertical frame member, the second vertical frame member, and the transition piece.

18. The method of claim 17 wherein the accessory comprises at least one of a tray, a map rail, and a flag holder.

19. The method of claim 17 wherein the step of attaching an accessory comprises the step of elastically deforming a flexible tooth in a channel wherein the tooth is coupled to one of the accessory and a frame member and the channel is provided by the other of the accessory and the frame member.

20. The method of claim 17, wherein the accessory is a first tray attached to the second horizontal frame member and a second tray attached to the fourth horizontal frame member, and wherein the transition piece further includes oppositely facing tray receiving portions such that when the at least one transition piece is positioned between the first and second boards, a first one of the oppositely facing tray receiving portions receives an end of the first tray and a second one of the oppositely facing tray receiving portions receives an end of the second tray.

* * * * *

UNITED STATES PATENT AND TRADEMARK OFFICE
CERTIFICATE OF CORRECTION

PATENT NO. : 7,632,103 B2  
APPLICATION NO. : 11/290981  
DATED : December 15, 2009  
INVENTOR(S) : Williams et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Second Day of November, 2010

David J. Kappos  
*Director of the United States Patent and Trademark Office*